(12) United States Patent
Ajalat (10) Patent No.: US 11,448,887 B2
(45) Date of Patent: Sep. 20, 2022

(54) MULTIFUNCTIONAL ILLUMINATED LIGHTING PAD

(71) Applicant: Michael Charles Ajalat, La Canada, CA (US)

(72) Inventor: Michael Charles Ajalat, La Canada, CA (US)

(*) Notice: Subject to any disclaimer, the term of this patent is extended or adjusted under 35 U.S.C. 154(b) by 0 days.

(21) Appl. No.: 17/074,620

(22) Filed: Oct. 19, 2020

(65) Prior Publication Data
US 2021/0116711 A1    Apr. 22, 2021

Related U.S. Application Data

(60) Provisional application No. 62/923,345, filed on Oct. 18, 2019.

(51) Int. Cl.
*G02B 27/02* (2006.01)
*F21V 15/01* (2006.01)
(Continued)

(52) U.S. Cl.
CPC .......... *G02B 27/024* (2013.01); *F21V 3/062* (2018.02); *F21V 3/08* (2018.02); *F21V 15/01* (2013.01);
(Continued)

(58) Field of Classification Search
CPC . B43L 1/004; B43L 1/12; B43L 3/001; G02B 27/024; B42D 5/007
See application file for complete search history.

(56) References Cited

U.S. PATENT DOCUMENTS 2,917,838 A * 12/1959 Neugass .............. B43L 1/126
434/410
3,215,453 A * 11/1965 Malcom, Jr. .......... B64D 43/00
40/546
(Continued)

FOREIGN PATENT DOCUMENTS

DE    202007006365 U1 *  7/2007  ............ A45C 15/06
EP       0743197 A1     11/1996
(Continued)

OTHER PUBLICATIONS

Deluxe Lighted Kneeboard, Retrieved from Internet, Retrieved on Aug. 5, 2020 <URL: https://www.sportys.com/deluxe-lighted-kneeboard-6223.html>.

*Primary Examiner* — Colin J Cattanach (57) ABSTRACT

A multifunctional illuminated lighting pad is an apparatus that enables a user to write with one hand, rather than requiring a hand to hold a clipboard or writing surface and another hand to write down information. The apparatus provides a mechanism by which to secure to a user, thus preventing difficulty or danger resulting from a loose clipboard. An illumination source provides ample light, allowing the user to read and write in otherwise poorly-lit areas. A portion of the opaque backing may be secured to a user's pocket and molded to the rough curvature of a leg. An exposed portion of a backing surface holds a writing surface, an LED, and a clip. A thumb-pull cut allows the user to insert or remove a reference sheet from between the plexiglass front plate and the backing, thus allowing the user to refer to information behind the plexiglass front plate while writing.

10 Claims, 7 Drawing Sheets

(51) Int. Cl.
*F21V 3/06* (2018.01)
*F21V 3/08* (2018.01)
*F21V 21/088* (2006.01)
*B43K 29/10* (2006.01)
*B42D 5/00* (2006.01)
*B43L 1/12* (2006.01)
*B43L 1/00* (2006.01)
*B43L 3/00* (2006.01)

(52) U.S. Cl.
CPC ............ *F21V 21/088* (2013.01); *B42D 5/007* (2013.01); *B43K 29/10* (2013.01); *B43L 1/004* (2013.01); *B43L 1/12* (2013.01); *B43L 3/001* (2013.01)

(56) References Cited

U.S. PATENT DOCUMENTS

| | | | | |
|---|---|---|---|---|
| 3,617,727 | A * | 11/1971 | Balfour-Lynn | F21L 15/06 362/20 |
| 3,808,415 | A * | 4/1974 | Hurst | G09B 29/00 362/604 |
| 4,083,136 | A | 4/1978 | Zelenko | |
| 4,254,568 | A * | 3/1981 | Ranalli | G09B 29/06 40/518 |
| 4,998,185 | A * | 3/1991 | DeNigris, Jr. | A45F 5/00 108/43 |
| 5,280,415 | A * | 1/1994 | Barnette | B42F 9/004 362/23.16 |
| 5,827,072 | A * | 10/1998 | Neufer | A63B 71/0608 434/416 |
| 6,050,201 | A * | 4/2000 | Blanchard | A47B 23/002 108/43 |
| 6,866,516 | B2 * | 3/2005 | Smith | B43K 23/001 434/408 |
| 8,201,718 | B1 | 6/2012 | Vargas-Lebron | |
| D708,669 | S * | 7/2014 | Sharma | D19/113 |
| 10,427,445 | B2 * | 10/2019 | Hudachek | B42D 1/007 |
| 2006/0158621 | A1 * | 7/2006 | Kirchhoff | G09B 11/00 353/119 |
| 2008/0023614 | A1 | 1/2008 | Beck | |
| 2008/0196286 | A1 * | 8/2008 | Rudell | G02B 6/0076 40/546 |
| 2012/0188649 | A1 * | 7/2012 | Skinner | B43L 1/12 359/619 |
| 2012/0196269 | A1 * | 8/2012 | Ureles | B43L 19/0056 434/415 |
| 2013/0101979 | A1 * | 4/2013 | Shanbour, II | B43L 1/00 434/408 |
| 2013/0120970 | A1 * | 5/2013 | Rojo | B42F 9/004 362/99 |
| 2014/0346764 | A1 * | 11/2014 | Lee | B43L 1/00 281/45 |
| 2018/0056707 | A1 | 3/2018 | Evans | |

FOREIGN PATENT DOCUMENTS

| | | | | |
|---|---|---|---|---|
| GB | 2454710 | A * | 5/2009 | ............ B43L 1/004 |
| GB | 2477305 | A * | 8/2011 | ............ B43L 3/008 |
| KR | 20120003363 | U * | 5/2012 | |
| KR | 101296185 | B1 | 3/2013 | |

* cited by examiner

MULTIFUNCTIONAL ILLUMINATED LIGHTING PAD

The current application claims a priority to the U.S. Provisional Patent application Ser. No. 62/923,345 filed on Oct. 18, 2019. The current application is filed on Oct. 19, 2020 while Oct. 18, 2020 was on a weekend.

FIELD OF THE INVENTION

The present invention relates generally to a writing and drawing board. More specifically, the multifunctional illuminated lighting pad relates to a flat surface optimized for use in multiple industries that require hands-free accessibility. The present invention further retains necessary documents to be seen by a user while writing and simultaneously improves visibility in poor lighting conditions.

BACKGROUND OF THE INVENTION

A wide variety of occupations rely upon the availability and convenience of writing tools. While its use has diminished as of late, paper still plays a crucial role for those who have to document events live, and more generally, as a convenient alternative to expensive, fragile, and often finnicky computers and devices. Writing requires the use of a surface upon which to apply pressure. Providing for this need, a variety of clipboards have been produced, each with the general principles of being lightweight and being flat as primary design factors. Many of these clipboards and writing surface tools also include clips adjacent to the top edge of the board, thereby allowing the user to secure their papers, and sometimes writings elements, in place during use.

However, such inventions are not optimal for use across multiple industries. Flight control operators, travelling doctors and nurses, and other such occupations rely upon the ability to use one hand freely while writing with the other. Conventional writing pads and surfaces do not allow the user this freedom and may therefore be a hindrance to the operator. Pilots in particular experience a wide range of problems associated with securing a writing board in place while the plane turns and flips in the air. A loose clipboard could, in extreme cases, prove to be a safety hazard in such situations. Further, conventional clipboards do not help the user manage suboptimal lighting conditions, such as writing at night or in a tunnel. A regular clipboard also makes it difficult to review other pages for reference when a user's hands are occupied. What is needed is a flat writing surface that provides a mechanism for securing to a user during use. Further desirable is a writing surface that illuminates for the user and provides a clear reference slot for storing reference papers and information.

The present invention addresses these issues. The multifunctional illuminated lighting pad can be easily secured to a clothing garment, enabling users to write without having to physically grasp the present invention. This enables a user to write with one hand while the other hand is free to operate machinery or the like. An illumination source provides ample light for allowing the user to read and write in otherwise dim or dark areas. A portion of the backing may be secured to the pocket and molded to the rough curvature of a leg. An exposed portion of a backing surface holds a writing surface, a light-emitting diode (LED), and a clip. The writing surface is preferably a fluorescent green plexiglass with finished edges. This writing surface may further have a thumb-pull cut into the center right side of the plexiglass. The thumb-pull cut allows the user to insert or remove a reference card in between the plexiglass front plate and the backing, thus allowing the user to reference information behind the plexiglass front plate while having the ability to write on the plexiglass front plate. Alternatively, the backing can be made from different materials suitable for specific applications.

DETAILED DESCRIPTION OF THE INVENTION

All illustrations of the drawings are for the purpose of describing selected versions of the present invention and are not intended to limit the scope of the present invention.

Figure 1:
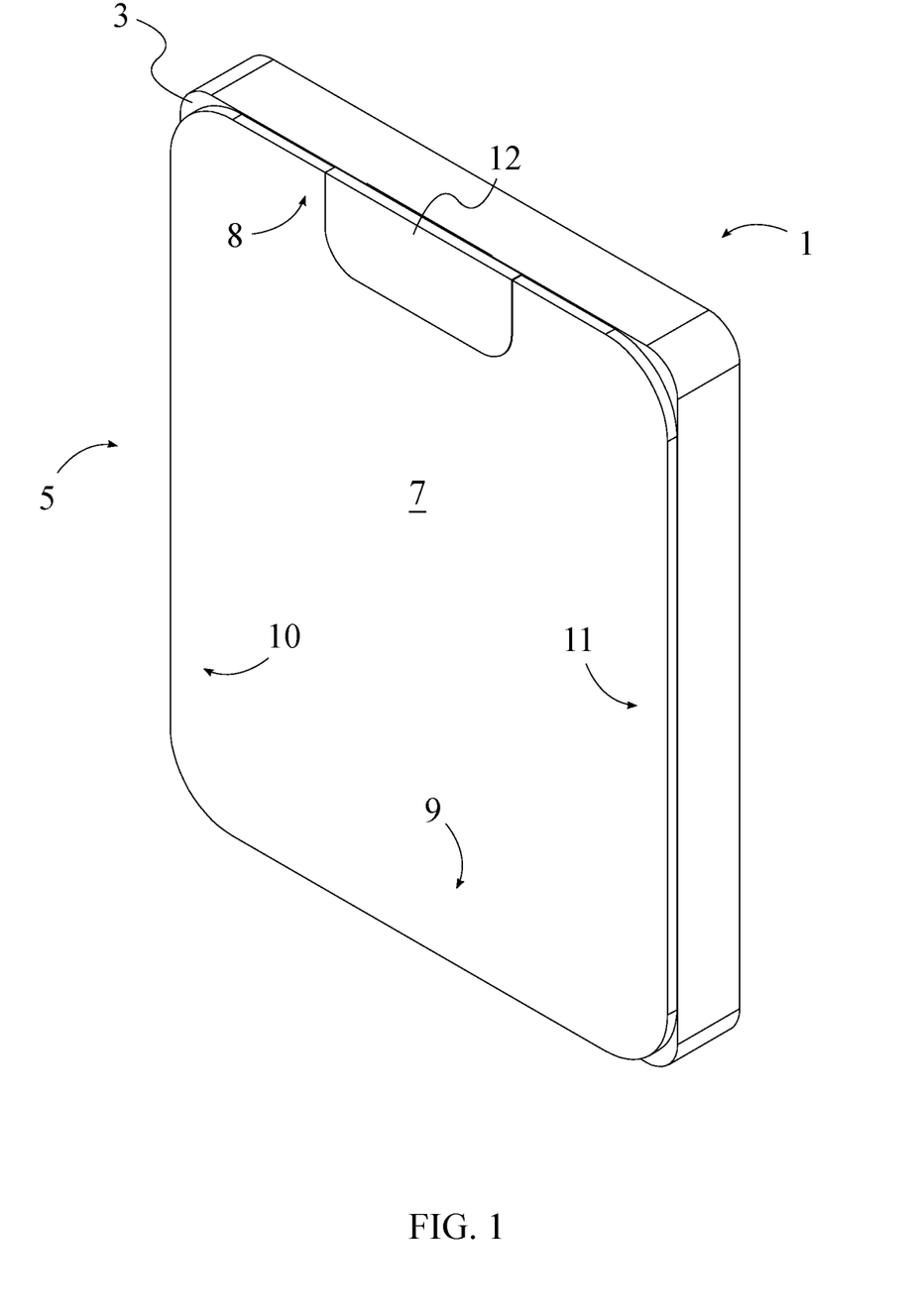
FIG. 1 is a front perspective view of the present invention.

The present invention is a multifunctional illuminated lighting pad that enables a user to write with one hand, rather than requiring a hand to hold a clipboard or writing surface and another hand to write down information. The present invention provides a mechanism by which to secure to a user, thus preventing difficulty or danger resulting from a loose clipboard. The present invention may comprise an opaque backing 1, a transparent panel 5, an illumination mechanism 12, and an attachment mechanism 13, as shown in FIG. 1. The opaque backing 1 is a rigid unit which enables arrangement of the transparent panel 5, the illumination mechanism 12, and the attachment mechanism 13 as well as general support of the present invention during some uses. The opaque backing 1 is also a visual backdrop that allows a user to better see what is written on the present invention. The transparent panel 5 is a clear, flat pane which a user may directly write on and which also allows the user to simultaneously protect and view reference sheets. The illumination mechanism 12 is a light source that may be any arrangement or combination of LEDs, fluorescent bulbs, incandescent bulbs, halogen bulbs, or other light-producing devices capable of illuminating the transparent panel 5. The attachment mechanism 13 allows the user to attach the present invention to the user's clothing. The opaque backing 1 comprises a proximal backing face 2 and a distal backing face 3. The proximal backing face 2 is the surface of the opaque backing 1 nearest to a user. The distal backing face 3 is the surface of the opaque backing 1 farthest from the user. The transparent panel 5 comprises a proximal panel face 6 and a distal panel face 7. The proximal panel face 6 is the surface of the transparent panel 5 nearest to the user. The distal panel face 7 is the surface of the transparent panel 5 farthest from the user upon which the user may write, in a preferred usage of the present invention.

Figure 2:
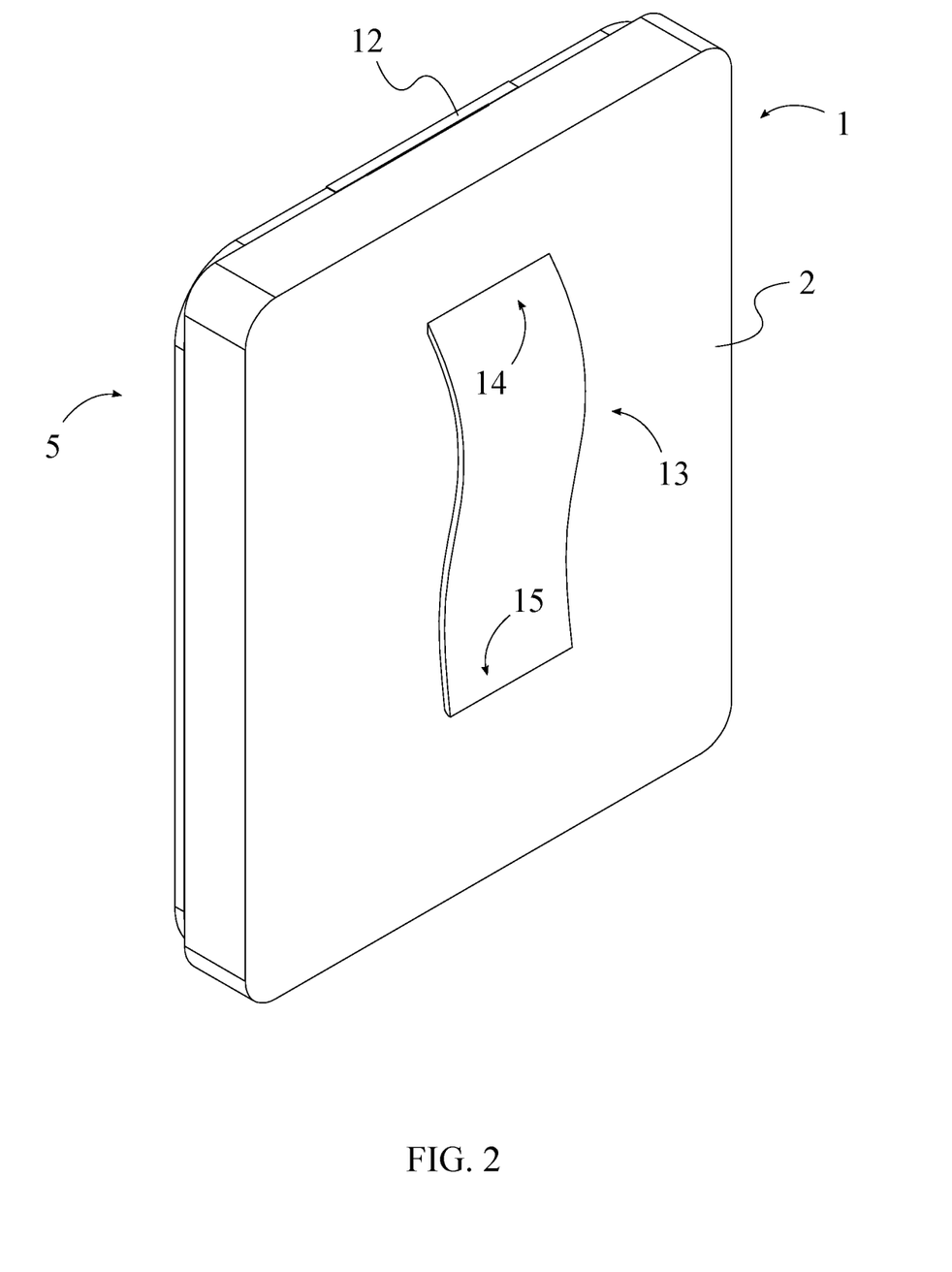
FIG. 2 is a back perspective view of the present invention.

The general configuration of the aforementioned components allows the present invention to efficiently and effectively provide a readily-available illuminated writing surface. The transparent panel 5 is mounted onto the opaque backing 1. This arrangement allows the user to simultaneously protect and view documents placed between the opaque backing 1 and the transparent panel 5. The proximal panel face 6 is positioned adjacent to the distal backing face 3. In this way, items, especially reference documents, are pressed between the proximal panel face 6 and the distal backing face 3. The illumination mechanism 12 is integrated into the distal backing face 3. This arrangement enables the illumination mechanism 12 to provide light from behind a reference document placed between the proximal panel face 6 and the distal backing face 3. The illumination mechanism 12 is in optical communication with the transparent panel 5. This arrangement enables even distribution of light across a document placed between the proximal panel face 6 and the distal backing face 3. The attachment mechanism 13 is mounted onto the proximal backing face 2, as shown in FIG. 2. In this way, the attachment mechanism 13 is appropriately oriented to connect to a user's clothing in order to position the distal panel face 7 in an optimal position for use.

Figure 3:
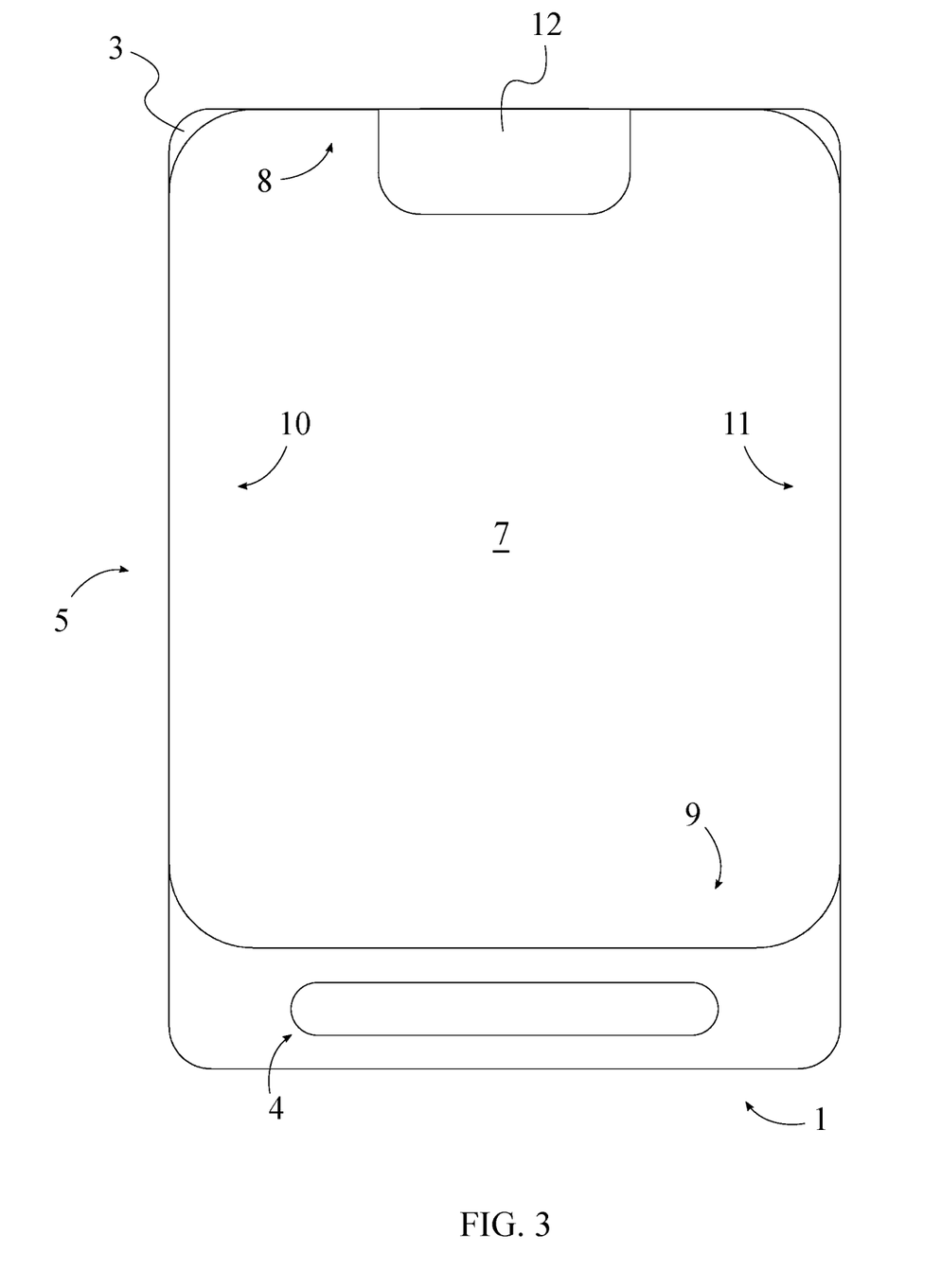
FIG. 3 is a front view of the present invention with a pocket-accessing hole.

The present invention may benefit from the ability to swap or modify a document placed between the proximal panel face 6 and the distal backing face 3. To this end, the transparent panel 5 may further comprise a fixed edge 8, a free edge 9, a first lateral edge 10, and a second lateral edge 11, as shown in FIG. 3. The fixed edge 8 relates to a section of the transparent panel 5 that remains fully-connected to the opaque backing 1. The free edge 9 is the section of the transparent panel 5 which swings open, providing access to the document or documents placed between the proximal panel face 6 and the distal backing face 3. The first lateral edge 10 is an edge of the transparent panel 5 adjacent to the fixed edge 8. Similarly, the second lateral edge 11 is an edge of the transparent panel 5 adjacent to the fixed edge 8. The fixed edge 8 and the free edge 9 are positioned opposite to each other across the transparent panel 5. This arrangement enables adjustment of the free edge 9 independently from the fixed edge 8. The first lateral edge 10 and the second lateral edge 11 are positioned opposite to each other across the transparent panel 5. In this way, the first lateral edge 10 and the second lateral edge 11 are both accessible to the user. The first lateral edge 10 and the second lateral edge 11 are positioned in between the fixed edge 8 and the free edge 9. This arrangement allows the user to adjust the position of the free edge 9 by grasping and subsequently adjusting the first lateral edge 10 and/or the second lateral edge 11. The fixed edge 8 is hingedly connected to the opaque backing 1. This arrangement enables the transparent panel 5 to rotate about the fixed edge 8 to open or close. The fixed edge 8 is positioned coincident to the distal backing face 3. In this way, rotating the free edge 9 about the fixed edge 8 results in a generally flat opening for containing reference material.

Figure 4:
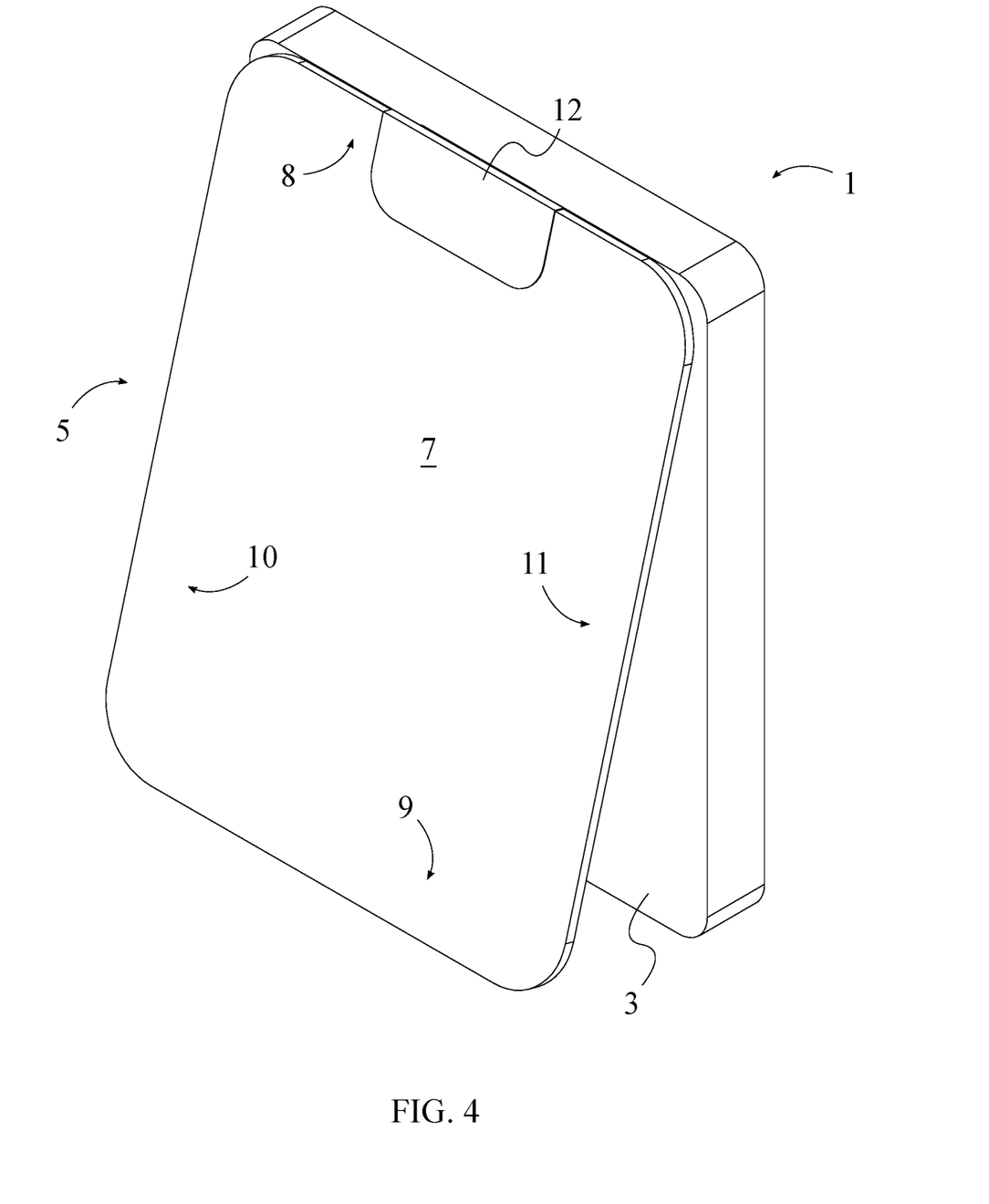
FIG. 4 is a front perspective view of the present invention with the transparent panel in an open configuration.
Figure 6:
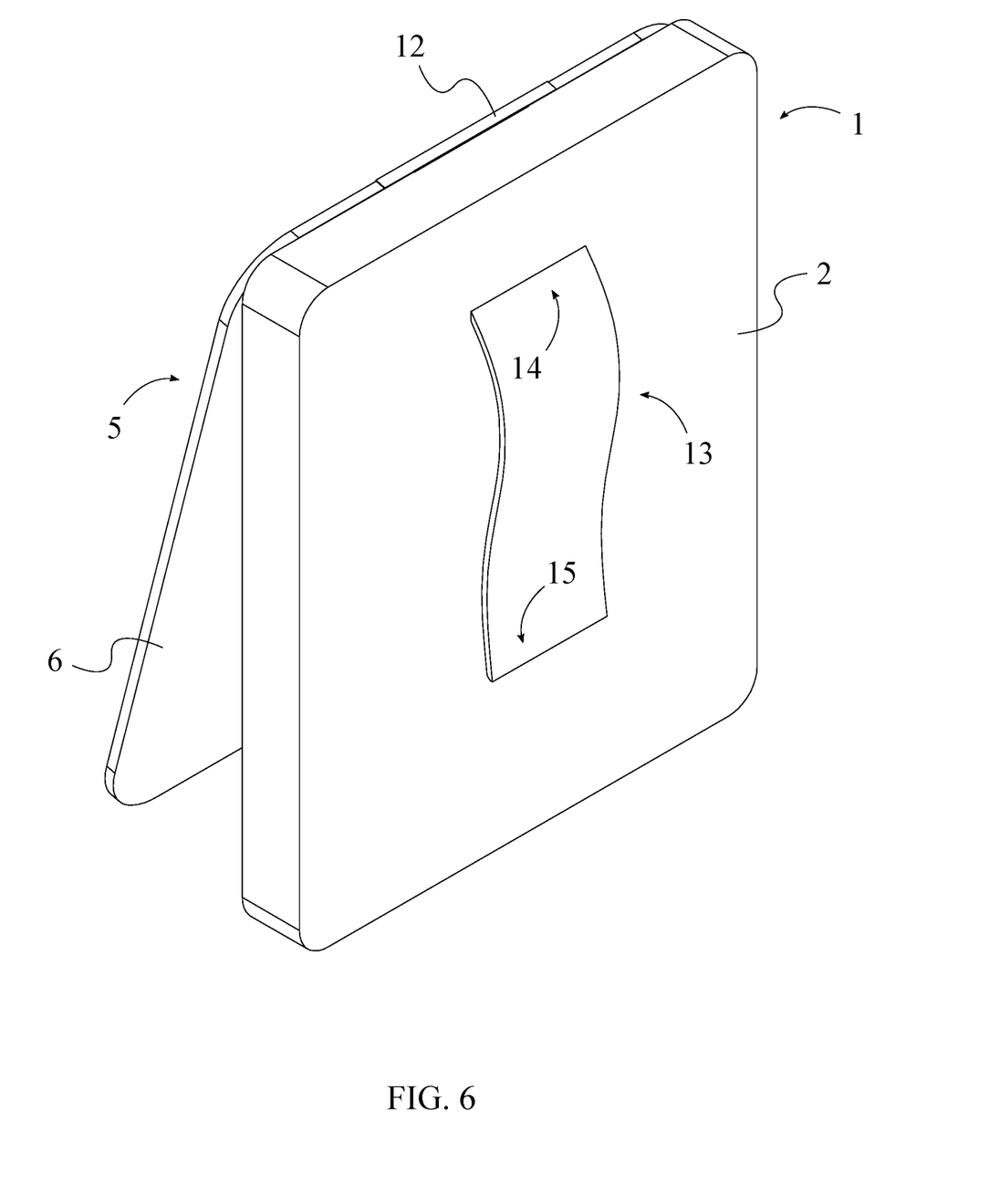
FIG. 6 is a back perspective view of the present invention with the transparent panel in an open configuration.

The user may wish to change reference papers during use. To this end, the opaque backing 1 and the transparent panel 5 may be in a paper-receiving configuration, as shown in FIGS. 4 and 6. A paper-receiving configuration is a configuration in which the present invention may accept new reference documents and remove undesirable ones. The free edge 9, the first lateral edge 10, and the second lateral edge 11 are positioned offset from the distal backing face 3. This arrangement enables the user to remove and add documents to the present invention for illumination and reference.

Figure 5:
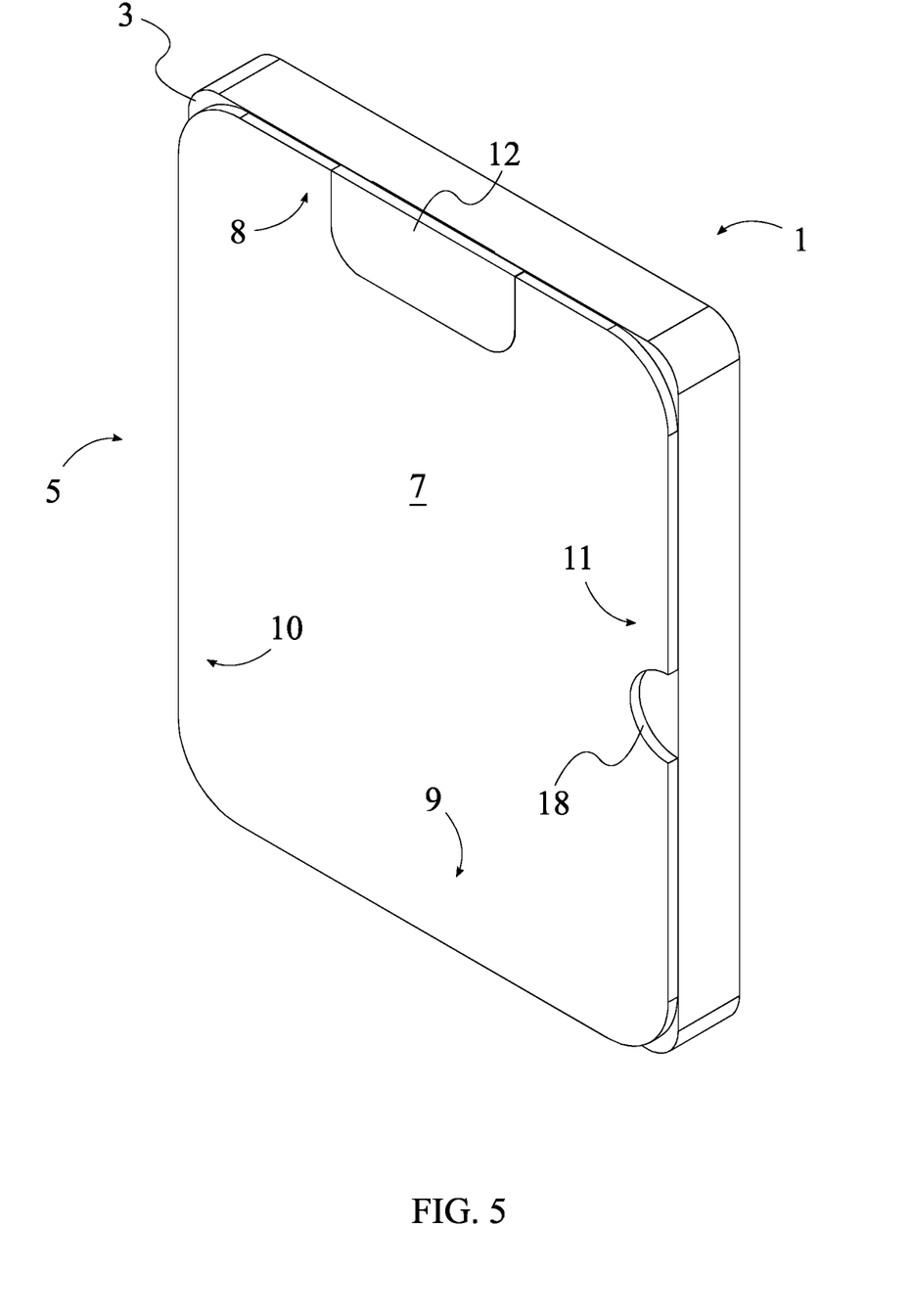
FIG. 5 is a front perspective view of the present invention with a thumb cutout.

The user may also wish to view the reference papers and write upon the present invention. To this end, the opaque backing 1 and the transparent panel 5 may be in a paper-viewing configuration, as shown in FIG. 1. The paper-viewing configuration also allows the user to write, in addition to providing the reference paper as desired. The free edge 9, the first lateral edge 10, and the second lateral edge 11 are hermetically attached against the distal backing face 3. This arrangement enables the present invention to protect the reference paper from damage due to water or other external hazards. The proximal panel face 6 and the distal backing face 3 are positioned offset from each other by a paper-receiving clearance. This allows the present invention enough room to fit a reference document in between the proximal panel face 6 and the distal backing face 3. In an exemplary embodiment, the present invention may provide more accessible mechanisms by which to access the reference documents contained between the opaque backing 1 and the transparent panel 5. To this end, the present invention may further comprise an access indent 18 as shown in FIG. 5. The access indent 18 relates to a cut through the transparent panel 5 and the opaque backing 1. This arrangement enables the user to remove and replace the reference document without separating the opaque backing 1 from the transparent panel 5.

The attachment mechanism 13 must be capable of securing to the user's clothing or body in order to prevent movement during use. To this end, the attachment mechanism 13 may be a pocket clip, as shown in FIG. 2. The pocket clip is a generally curved extrusion that enables the user to secure the present invention between the pocket clip and the proximal backing face 2. The pocket clip comprises a fixed end 14 and a free end 15.

The fixed end 14 relates to a section of the pocket clip that remains in place relative to the proximal backing face 2. The free end 15 is the section of the pocket clip that extends into a user's pocket. The fixed end 14 is mounted onto the proximal backing face 2. This allows the pocket clip to be secured in place on the opaque backing 1. The free end 15 being positioned offset from the proximal backing face 2. This arrangement enables the attachment mechanism 13 to secure the user's clothing, especially a user's pocket.

Figure 7:
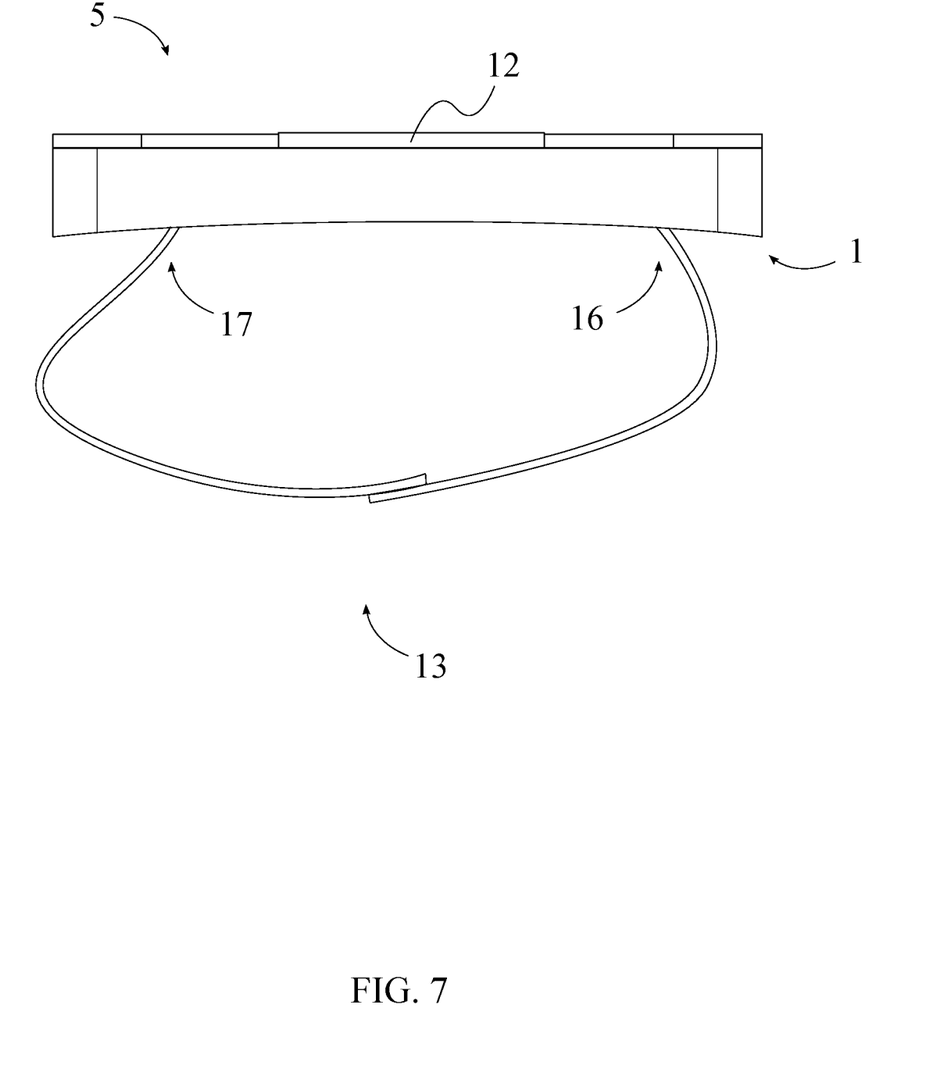
FIG. 7 is a top view of the present invention with a leg strap.

The attachment mechanism 13 may need to be more secure than what the pocket clip can offer. Therefore, the attachment mechanism 13 may be at least one length-adjustable leg strap, as shown in FIG. 7. The at least one length-adjustable leg strap relates to a flexible band which may secure around a user's leg or other limb. The at least one length-adjustable leg strap comprises a first strap end 16 and a second strap end 17. The first strap end 16 is an end of the at least one length-adjustable leg strap that secures around the user's leg in a first direction. Similarly, the second strap end 17 is an end of the at least one length-adjustable leg strap that secures around the user's leg in a second direction. The first strap end 16 and the second strap end 17 are mounted onto the opaque backing 1. In this way, the opaque backing 1 may be positioned adjacent to a user's leg. The first strap end 16 and the second strap end 17 are positioned opposite each other across the proximal backing face 2. In this way, the at least one length-adjustable leg strap is used in combination with the proximal backing face 2 to encircle a user's leg and secure the present invention to the user's leg.

A user may wish to access items in a pocket while the user is wearing the present invention. To this end, the opaque backing 1 may further comprise at least one pocket-accessing hole 4, as shown in FIG. 3. The at least one pocket-accessing hole 4 is a preferably slot-shaped hole that enables a user to reach through the present invention to access items on the other side. The at least one pocket-accessing hole 4 is positioned offset from the transparent panel 5. More specifically, the at least one pocket-accessing hole 4 is positioned adjacent to the free edge 9, opposite to the fixed edge 8. In this way, the at least one pocket-accessing hole 4 does not affect the provided writing area of the distal panel face 7. The at least one pocket-accessing hole 4 traverses from the distal backing face 3 to the proximal backing face 2. Thus, the user may reach through the present invention unobstructed to reach into the user's pocket.

The proximal backing face 2 is preferably optimized to assist in securing the present invention to a user's leg. To further enhance the ability of the present invention to secure to a user's leg, the proximal backing face 2 may be shaped as a leg-bracing concave surface, as shown in FIG. 7. This arrangement ensures that the present invention has improved contact area with a user's leg.

The user may wish to make notes on a reference paper without damaging or modifying the reference paper. To enable this, the distal panel face 7 may be a dry-writing surface. In this way, the user may write directly onto the distal panel face 7 without contacting or removing the reference paper. In addition, dry erase writing utensils are preferably used to mark and make notes on the dry-writing surface.

The transparent panel 5 must both allow the user to see reference material and simultaneously provide even illumination to the reference material. To this end, the transparent panel 5 may be made of green-tinted fluorescent plexiglass. In this way, light from the illumination mechanism 12 may be evenly dispersed along the transparent panel 5, enhancing the user's ability to see relevant information during use.

The opaque backing 1 must be sturdy enough to provide a solid foundation for the present invention, as well as to protect internal electronic components required for the illumination mechanism 12. To this end, the opaque backing 1 may be made of acrylic-polyvinyl chloride thermoplastic. This material enables the opaque backing 1 to protect components from damage due to a variety of external stimuli.

Although the invention has been explained in relation to its preferred embodiment, it is to be understood that many other possible modifications and variations can be made without departing from the spirit and scope of the invention as hereinafter claimed.

What is claimed is:

1. A multifunctional illuminated writing pad comprises:
an opaque backing;
a transparent panel;
an illumination mechanism;
an attachment mechanism;
an access indent;
the attachment mechanism being a pocket clip;
the opaque backing comprises a proximal backing face, a distal backing face, and at least one pocket-accessing hole;
the transparent panel comprises a proximal panel face, a distal panel face, a fixed edge, a free edge, a first lateral edge, and a second lateral edge;
the pocket clip comprises a fixed end and a free end;
the transparent panel being mounted onto the opaque backing;
the proximal panel face being positioned adjacent to the distal backing face;
the illumination mechanism being integrated into the distal backing face;
the illumination mechanism being in optical communication with the transparent panel; and
the attachment mechanism being mounted onto the proximal backing face;
the fixed edge and the free edge being positioned opposite to each other across the transparent panel;
the first lateral edge and the second lateral edge being positioned opposite to each other across the transparent panel;
the first lateral edge and the second lateral edge being positioned in between the fixed edge and the free edge;
the fixed edge being hingedly connected to the opaque backing;
the fixed edge being positioned coincident to the distal backing face;
the free edge, the first lateral edge, and the second lateral edge being configured to selectively form a hermetical seal with the distal backing face;
the fixed end being mounted onto the proximal backing face;
the free end being positioned offset from the proximal backing face;
the at least one pocket-accessing hole being positioned offset from the transparent panel;
the at least one pocket-accessing hole being positioned adjacent to the free edge, opposite to the fixed edge;
the at least one pocket-accessing hole traversing from the distal backing face to the proximal backing face;
the proximal backing face being shaped as a contiguous leg-bracing concave surface;
the transparent panel being made of green-tinted fluorescent plexiglass; and
the access indent laterally traversing into the transparent panel.

2. The multifunctional illuminated writing pad as claimed in claim 1, wherein, in a paper-receiving configuration of the opaque backing and the transparent panel, the free edge, the first lateral edge, and the second lateral edge are positioned offset from the distal backing face.

3. The multifunctional illuminated writing pad as claimed in claim 1, wherein, in a paper-viewing configuration of the opaque backing and the transparent panel, the free edge, the first lateral edge, and the second lateral edge are attached against the distal backing face; and the proximal panel face and the distal backing face are positioned offset from each other by a paper-receiving clearance.

4. The multifunctional illuminated writing pad as claimed in claim 1, wherein the distal panel face is a dry-writing surface.

5. The multifunctional illuminated writing pad as claimed in claim 1, wherein the opaque backing is made of acrylic-polyvinyl chloride thermoplastic.

6. A multifunctional illuminated writing pad, comprising:
an opaque backing;
a transparent panel;
an illumination mechanism;
an attachment mechanism;
an access indent;
the attachment mechanism being at least one length-adjustable leg strap;
the opaque backing comprises a proximal backing face, a distal backing face, and at least one pocket-accessing hole;
the transparent panel comprises a proximal panel face, a distal panel face, a fixed edge, a free edge, a first lateral edge, and a second lateral edge;
the at least one length-adjustable leg strap comprises a first strap end and a second strap end;
the transparent panel being mounted onto the opaque backing;
the proximal panel face being positioned adjacent to the distal backing face;

the illumination mechanism being integrated into the distal backing face;

the illumination mechanism being in optical communication with the transparent panel;

the attachment mechanism being mounted onto the proximal backing face;

the at least one pocket-accessing hole being positioned offset from the transparent panel;

the at least one pocket-accessing hole being positioned adjacent to the free edge, opposite to the fixed edge;

the at least one pocket-accessing hole traversing from the distal backing face to the proximal backing face;

the fixed edge and the free edge being positioned opposite to each other across the transparent panel;

the first lateral edge and the second lateral edge being positioned opposite to each other across the transparent panel;

the first lateral edge and the second lateral edge being positioned in between the fixed edge and the free edge;

the fixed edge being hingedly connected to the opaque backing;

the fixed edge being positioned coincident to the distal backing face;

the free edge, the first lateral edge, and the second lateral edge being configured to selectively form a hermetical seal with the distal backing face;

the first strap end and the second strap end being mounted onto the opaque backing;

the first strap end and the second strap end being positioned opposite each other across the proximal backing face;

the proximal backing face being shaped as a contiguous leg-bracing concave surface;

the transparent panel being made of green-tinted fluorescent plexiglass; and the access indent laterally traversing into the transparent panel.

7. The multifunctional illuminated writing pad as claimed in claim 6, wherein, in a paper-receiving configuration of the opaque backing and the transparent panel, the free edge, the first lateral edge, and the second lateral edge are positioned offset from the distal backing face.

8. The multifunctional illuminated writing pad as claimed in claim 6, wherein, in a paper-viewing configuration of the opaque backing and the transparent panel, the free edge, the first lateral edge, and the second lateral edge are attached against the distal backing face; and the proximal panel face and the distal backing face are positioned offset from each other by a paper-receiving clearance.

9. The multifunctional illuminated writing pad as claimed in claim 6, wherein the distal panel face is a dry-writing surface.

10. The multifunctional illuminated writing pad as claimed in claim 6, wherein the opaque backing is made of acrylic-polyvinyl chloride thermoplastic.

* * * * *